US005680910A

United States Patent [19]

Sarphie, IV

[11] Patent Number: 5,680,910
[45] Date of Patent: Oct. 28, 1997

[54] CLIMBING TREE STAND

[76] Inventor: Joe E. Sarphie, IV, P.O. Box 3942, Butte, Mont. 59702

[21] Appl. No.: 368,028

[22] Filed: Jan. 3, 1995

[51] Int. Cl.$^6$ .................................................. A45F 3/26
[52] U.S. Cl. .......................................... 182/135; 182/187
[58] Field of Search .................................. 182/133–136, 182/187, 188

[56] References Cited

U.S. PATENT DOCUMENTS

| | | | |
|---|---|---|---|
| D. 270,951 | 10/1983 | Cryar | D25/62 |
| D. 275,235 | 8/1984 | Warren et al. | D25/62 |
| D. 320,460 | 10/1991 | Dubroc | D25/62 |
| 910,006 | 1/1909 | Lowy | 182/7 |
| 2,842,300 | 1/1958 | Johnson | 227/24 |
| 3,856,111 | 12/1974 | Baker | 182/135 |
| 3,960,240 | 6/1976 | Cotton | 182/20 |
| 4,316,526 | 2/1982 | Amacker | 182/135 |
| 4,321,982 | 3/1982 | Strickland | 182/20 |
| 4,321,983 | 3/1982 | Nelson | 182/136 |
| 4,331,216 | 5/1982 | Amacker | 182/135 |
| 4,337,844 | 7/1982 | Hice, Sr. | 182/187 |
| 4,369,858 | 1/1983 | Babb | 182/134 |
| 4,406,349 | 9/1983 | Vilchek | 182/7 |
| 4,417,645 | 11/1983 | Untz | 182/135 |
| 4,427,092 | 1/1984 | Tenter | 182/134 |
| 4,428,459 | 1/1984 | Peck | 182/187 |
| 4,452,338 | 6/1984 | Untz | 182/187 |
| 4,458,782 | 7/1984 | Meyer | 182/187 |
| 4,474,265 | 10/1984 | Shinkle | 182/187 |
| 4,488,620 | 12/1984 | Gibson | 182/135 |
| 4,549,633 | 10/1985 | Merritt | 182/135 |
| 4,553,634 | 11/1985 | Roberts et al. | 182/134 |
| 4,595,076 | 6/1986 | Gober | 182/136 |
| 4,595,079 | 6/1986 | Shope | 182/187 |
| 4,596,309 | 6/1986 | Venson | 182/187 |
| 4,597,473 | 7/1986 | Peck | 182/187 |
| 4,723,630 | 2/1988 | Wolford et al. | 182/134 |
| 4,726,447 | 2/1988 | Gibson et al. | 182/135 |
| 4,802,552 | 2/1989 | Williams | 182/187 |
| 4,809,815 | 3/1989 | Wallace | 182/133 |
| 4,834,217 | 5/1989 | Manes | 182/187 |
| 4,886,143 | 12/1989 | Dubroc | 182/142 |
| 4,890,694 | 1/1990 | Williams | 182/187 |
| 4,909,353 | 3/1990 | Govin et al. | 182/187 |
| 4,942,942 | 7/1990 | Bradley | 182/187 |
| 4,953,662 | 9/1990 | Porter | 182/135 |
| 4,969,538 | 11/1990 | Amacker | 182/187 |
| 4,987,972 | 1/1991 | Helms | 182/187 |
| 4,995,475 | 2/1991 | Berkbuegler | 182/187 |
| 4,997,063 | 3/1991 | Bradley | 182/187 |
| 5,009,285 | 4/1991 | Ramsey | 182/187 |
| 5,016,733 | 5/1991 | Bradley | 182/187 |
| 5,052,516 | 10/1991 | Jamieson | 182/135 |
| 5,090,504 | 2/1992 | Amacker | 182/134 |
| 5,090,505 | 2/1992 | Amacker | 182/187 |
| 5,090,506 | 2/1992 | Womack et al. | 182/187 |
| 5,097,925 | 3/1992 | Walker, Jr. | 182/135 |
| 5,101,933 | 4/1992 | Huntley | 182/187 |
| 5,101,934 | 4/1992 | Zumbro | 182/187 |
| 5,103,935 | 4/1992 | Amacker | 182/187 |
| 5,143,176 | 9/1992 | Burdette | 182/187 |
| 5,156,236 | 10/1992 | Gardner et al. | 182/187 |
| 5,167,298 | 12/1992 | Porter | 182/187 |

(List continued on next page.)

OTHER PUBLICATIONS

Bow Hunter Discount Warehouse, Inc pp. 114–134, Summer Edition 1993.

Primary Examiner—Alvin C. Chin-Shue

[57] ABSTRACT

A device for climbing and supporting a person above the ground, on trees, poles, or other vertical structures of limited diameter, using two climbing frame members. Each frame member having two, spaced and parallel, side elements. Each side element having an inclined proximal end, and a substantially horizontal distal end. Each frame member having an assembly mated to the inclined ends for engaging the side of the tree opposite the user, and an abutment for engaging the user's side of the tree, creating a pincer grip of the tree. The first frame member having a seat to support the body of the user; and the second frame member having a platform to support the feet of the user.

6 Claims, 4 Drawing Sheets

U.S. PATENT DOCUMENTS

| | | | |
|---|---|---|---|
| 5,226,505 | 7/1993 | Woller et al. | 182/187 |
| 5,234,076 | 8/1993 | Louk et al. | 182/187 |
| 5,234,077 | 8/1993 | Sheriff | 182/187 |
| 5,249,644 | 10/1993 | Amacker | 182/134 |
| 5,265,780 | 11/1993 | Matthews et al. | 224/155 |
| 5,310,019 | 5/1994 | Paul | 182/187 |
| 5,311,967 | 5/1994 | Kennedy | 182/187 X |

CLIMBING TREE STAND

BACKGROUND—FIELD OF INVENTION

The present invention relates to devices for climbing and supporting a person above the ground on trees, poles and other vertical structures of limited diameter.

BACKGROUND—DESCRIPTION OF PRIOR ART

The relevant art is replete with tree and pole climbing apparatus of various descriptions, for the purpose of elevating a user above the ground. Hunters and others use this equipment to avoid the senses of intended game animals.

The problem of avoiding detection by animals was approached by constructing permanent tree stands and blinds, with the obvious disadvantage of immobility.

Various portable tree stands have been designed. Some chain on, as illustrated in U.S. Pat. No. Des. 320,460—Dubroc, Oct. 1, 1991; U.S. Pat. No. 4,474,265—Shinkle, Oct. 2, 1984; U.S. Pat. No. 4,886,143—Dubroc, Dec. 12, 1989; and U.S. Pat. No. 5,009,285—Ramsey, Apr. 23, 1991; and require the use of a climbing device such as a ladder or screw-in steps, to mount and access. This type of portable stand is inconvenient, difficult to use, and endangers the user when making the transition from climbing device to stand.

The prior art includes climbing aids, as illustrated in U.S. Pat. No. 2,842,300 Johnson, Jul. 8, 1958; which may be utilized to prevent falling, during a climb; but, also requires the use of a climbing device, such as climbing spikes.

Various climbing tree stands have been designed, and can generally be divided into three categories, or types of operation.

First is the single platform type, as illustrated in U.S. Pat. No. Des. 275,235—Warren et al, Aug. 21, 1984; U.S. Pat. No. 4,321,982—Strickland, Mar. 30, 1982; U.S. Pat. No. 4,369,858—Babb, Jan. 25, 1983; U.S. Pat. No. 4,427,092—Tentler, Jan. 24, 1984; U.S. Pat. No. 4,428,459—Peck, Jan. 31, 1984; U.S. Pat. No. 4,458,782—Meyer, Jul. 10, 1984; U.S. Pat. No. 4,553,634—Roberts et al, Nov. 19, 1985; U.S. Pat. No. 4,596,309—Venson, Jun. 24, 1986; U.S. Pat. No. 4,595,079—Shope, Jun. 17, 1986; U.S. Pat. No. 4,597,473 Peck, Jul. 1, 1986; U.S. Pat. No. 4,723,630—Wolford et al, Feb. 9, 1988; U.S. Pat. No. 4,909,353—Govin et al, Mar. 20, 1990; U.S. Pat. No. 4,995,475—Berkbuegler, Feb. 26, 1991; U.S. Pat. No. 5,090,506—Womack et al, Feb. 25, 1992; and U.S. Pat. No. 5,101,933—Huntley, Apr. 7, 1992. With this type the user hugs the tree with his arms, and raises the platform with his legs and feet, in order to climb. These platforms am heavy, and awkward to operate, or transport; making them inconvenient. Hugging the tree, necessitates the user being in close contact with the tree; which means his clothing snags on the tree bark, causing undesirable noise, and making movement difficult. The stance of the user, during the climb, makes control of the platform difficult; which adds to the noise level, and limits the progress of each maneuver. The safety of the user during the maneuver is dependant on his grip of the tree. After the desired elevation is reached, the user must either sit or stand on the platform, with little else to support or restrain him.

Second is the single platform type with a separate hand climber, as illustrated in U.S. Pat. No. 3,856,111—Baker, Dec. 24, 1974; U.S. Pat. No. 4,595,076—Gober, Jun. 17, 1986; U.S. Pat. No. 4,802,552—Williams, Feb. 7, 1989; 4,809,815—Wallace, Mar. 7, 1989; U.S. Pat. No. 4,890,694—Williams, Jan. 2, 1990; U.S. Pat. No. 5,101,934—Zumbro, Apr. 7, 1992; and U.S. Pat. No. 5,265,780—Matthews et al, Nov. 30, 1993. These combinations are heavier, and more awkward to transport; making them even more inconvenient. To operate, the user elevates and grasps the hand climber; while raising the platform with his legs and feet. This type affords a better hand hold than the single platform type, but offers little additional support; and requires more strength than some user's possess, thus making operation difficult and dangerous.

Third is the dual platform type, as illustrated in U.S. Pat. No. Des. 270,951—Cryar, Oct. 11, 1983; U.S. Pat. No. 3,960,240—Cotton, Jun. 1, 1976; U.S. Pat. No. 4,316,526—Amacker, Feb. 23, 1982; U.S. Pat. No. 4,321,983—Nelson, Mar. 30, 1982; U.S. Pat. No. 4,331,216—Amacker, May 25, 1982; U.S. Pat. No. 4,337,844—Hice, Jul. 6, 1982; U.S. Pat. No. 4,417,645—Untz, Nov. 29, 1983; U.S. Pat. No. 4,452,338—Untz, Jun. 5, 1984; U.S. Pat. No. 4,488,620—Gibson, Dec. 18, 1984; U.S. Pat. No. 4,549,633—Merritt, Oct. 29, 1985; U.S. Pat. No. 4,726,447—Gibson et al, Feb. 23, 1988; U.S. Pat. No. 4,834,217—Manes, May 30, 1989; U.S. Pat. No. 4,942,942 Bradley, Jul. 24, 1990; U.S. Pat. No. 4,953,662—Porter, Sep. 4, 1990; U.S. Pat. No. 4,969,538—Amacker, Nov. 13, 1990; U.S. Pat. No. 4,987,972—Helms, Jan. 29, 1991; U.S. Pat. No. 4,997,063—Bradley, Mar. 5, 1991; U.S. Pat. No. 5,016,733—Bradley, May 21, 1991; U.S. Pat. No. 5,052,516—Jamieson, Oct. 1, 1991; U.S. Pat. No. 5,090,504—Amacker, Feb. 25, 1992; U.S. Pat. No. 5,090,505—Amacker, Feb. 25, 1992; U.S. Pat. No. 5,097,925—Walker, Mar. 24, 1992; U.S. Pat. No. 5,103,935—Amacker, Apr. 14, 1992; U.S. Pat. No. 5,143,176—Burdette, Sep. 1, 1992; U.S. Pat. No. 5,156,236—Gardner et al, Oct., 20, 1992; U.S. Pat. No. 5,167,298—Porter, Dec., 1, 1992; U.S. Pat. No. 5,226,505—Woller et al, Jul. 13, 1993; 5,249,644—Amacker, Oct. 5, 1993; U.S. Pat. No. 5,234,076—Louk et al, Aug. 10, 1993; and U.S. Pat. No. 5,234,077—Sheriff, Aug. 10, 1993. With this type, the user sits on the upper platform, while raising the lower platform with his legs and feet; then stands on the lower platform, while raising the upper platform with his hands. This is generally the safer of the three types; in that it allows the user to rest on one platform, while moving the other. But, this type is also the heaviest, and most awkward to transport; some are complicated to assemble on the tree; some have an excessive number of elements, making them noisy, and difficult to use.

A disadvantage common to all three categories is the use of a tree-gripping backstrap, planar with the frames inclined side elements. When weight is applied to the frame platform, torsion is created at the point of connection between the frames inclined side elements and the backstrap; this results in undue stress to the side elements and the backstrap.

Additionally, the orientation of the backstrap lengthens the vertical leg of the lever formed by the frame and the backstrap; thereby reducing the mechanical advantage of the users weight; thus reducing the stability of the stand.

Some prior art use blades or spikes attached to the backstrap or the proximal end of the frame, to augment its grip on the tree. These embed, and damage the tree; as well as make maneuvering difficult, and noisy.

Some prior art use flexible backstraps, which can be difficult to position during the climb; and if weight is applied to either the proximal or distal ends of the platform, the backstrap can flex and slip, causing the climber to fall.

Much of the prior art lacks the inherent safety needed for use by the general public. Most lack a restraint means to prevent the user falling from the stand. Some are difficult to operate, which contributes to their lack of safety. Most of the prior art grips the tree on two sides, basically front and rear; which renders the stand unstable if the user places his weight on one side of the platform.

All of the prior art share the problems of excess weight; awkwardness; and noisiness.

Each of these problems renders the design inefficient for its intended use.

OBJECTS AND ADVANTAGES

Accordingly, several objects and advantages of this invention are to provide a climbing stand comprised of an upper frame member and a lower frame member. The upper frame member including a gripping girth and abutment, to engage the tree or pole; and further includes a seat, to support the body of the user. The lower frame member is similarly formed except it may be of a different length than the length of the upper frame member; and includes a platform to support the feet of the user.

More particularly, it is an object of this invention to provide a climbing stand constructed of elements that serve more than one structural function; thereby reducing the number of elements, and weight, in order to make operation simple and quiet, and transport convenient It is a further object of the invention to support the user safely and securely, when resting on the upper frame member, while raising the lower frame member by lifting his legs and feet.

It is a further object of the invention to provide the upper frame member with a restraint, to reduce the user's risk of falling from the stand.

It is a further object of the invention to provide an abutment that engages the vertical structure on three or more sides; thereby improving the stability of the stand; and reducing the load at each point of contact, thus reducing damage to the structure.

It is a further object of the invention to provide a gripping girth assembly that minimizes torsion at the point of connection between the frame's side elements, and the girth assembly; thereby reducing stress, and thus making the design more structurally sound.

It is a further object of the invention to provide a gripping girth assembly that shortens the vertical leg of the lever formed by the frame and girth assembly; thereby increasing the mechanical advantage of the user's weight, and thus enhancing the stability of the stand.

Further objects and advantages of this invention will become apparent from a consideration of the drawings and ensuing description.

BRIEF DESCRIPTION OF THE DRAWINGS

Apparatus embodying features of this invention are depicted in the accompanying drawings which form a portion of this disclosure and wherein.

LIST OF REFERENCE NUMERALS 12. upper frame member
13. girth assembly
14. girth
16. locking lug
17. bias spring
18. locking lug
19. bias spring
20. engagement sleeve
22. engagement sleeve
24. side element
26. side element
28. diagonal brace
30. diagonal brace
32. transverne element
34. lock-engagement holes
36. sling attachment means
38. sling attachment means (not shown)
40. lower frame member
41. girth assembly
42. girth
44. locking lug
45. bias spring
46. locking lug
47. bias spring
48. engagement sleeve
50. engagement sleeve
52. side element
54. side element
56. diagonal brace
58. diagonal brace
60. transverse element
62. lock-engagement holes
64. foot platform
66. sling seat assembly
68. sling clip
70. sling clip
72. sling strap
73. adjustment buckle
74. sling strap
75. adjustment buckle
76. seat restraint belt
78. restraint adjustment buckle
80. sling seat
82. seat strap
84. seat strap
86. seat strap
88. seat strap
90. second-embodiment backstrap assembly
91. second-embodiment backstrap assembly (not shown)
92. girth
93. girth
96. engagement guide
97. engagement guide
98. engagement guide
99. engagement guide
100. locking lug 101. locking lug
102. locking lug
103. locking lug (not shown)
104. bias spring
105. bias spring (not shown)
106. second-embodiment upper-frame member
108. side element
110. side element
112. transverse member
114. transverse member
116. transverse member
118. seat
120. diagonal brace
122. diagonal brace
124. lock-engagement holes
126. second-embodiment lower-frame member
128. side element
130. side element
132. transverse element
134. transverse element
136. transverse element
138. foot platform
140. diagonal brace
142. diagonal brace
144. lock-engagement holes
146. bias spring
148. bias spring (not shown)

DESCRIPTION—FIGS. 1 to 6

Figure 1:
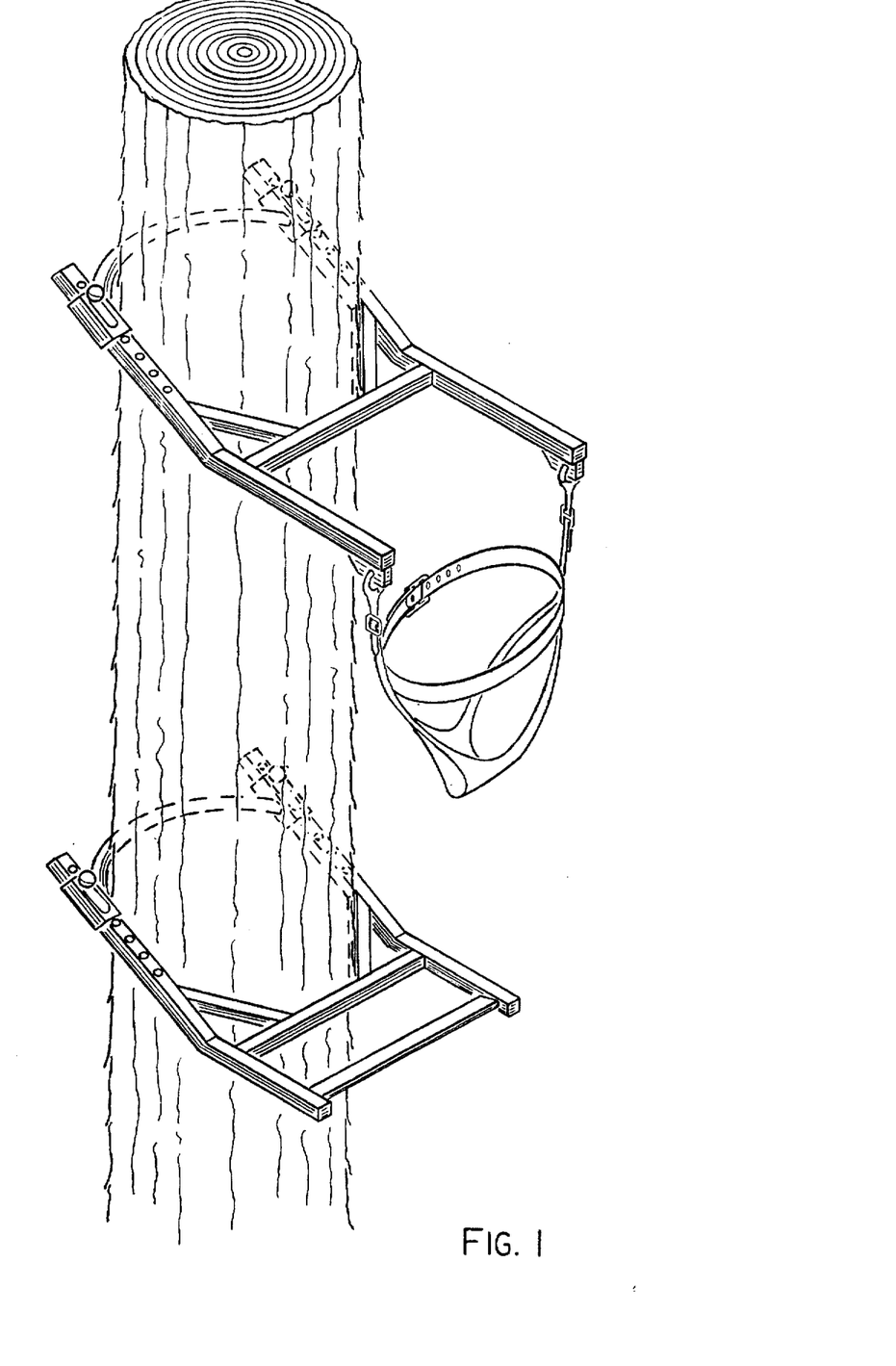
FIG. 1 is a perspective view of the preferred embodiment attached to a tree in an operating position.

A climbing stand comprised of an upper-climbing frame member 12, a lower-climbing frame member 40, and a sling seat assembly 66, in a climbing configuration, is illustrated in FIG. 1. The climbing stand is utilized by a hunter or other user, for climbing a tree or another vertical structure column of limited diameter, and maintaining a position above the ground.

In the preferred embodiment, the frames 12, and 40 are made of a rigid material of sufficient strength to support the user; such as steel or aluminum tubing. Assembly 66 is made of a flexible material of sufficient strength to support the user; such as nylon webbing or leather.

Figures 2, 3:
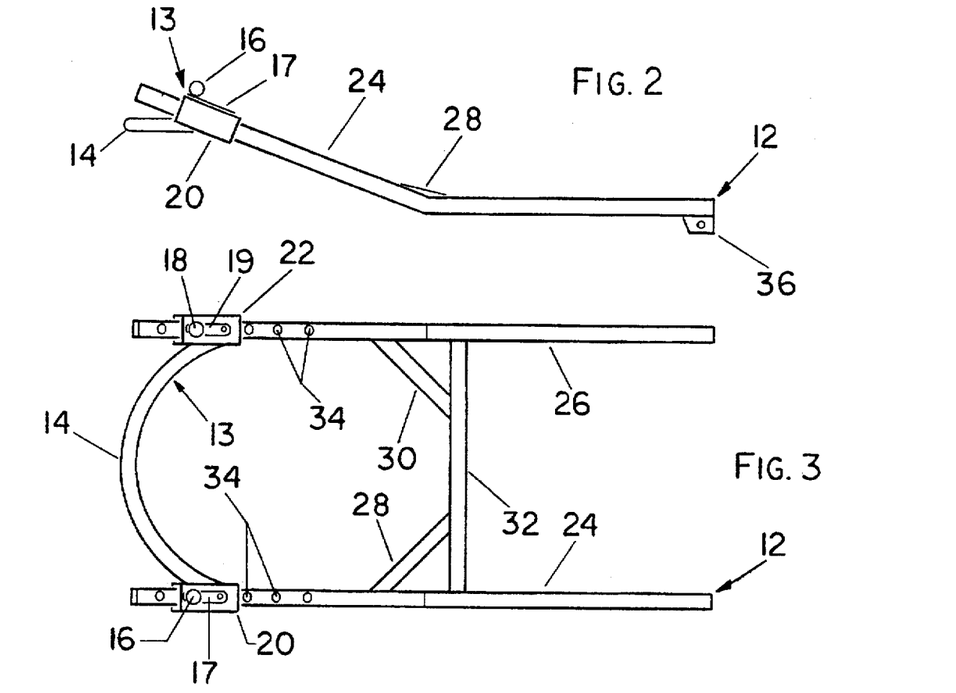
FIG. 2 is a side elevation view of the upper frame member, with the preferred embodiment.
FIG. 3 is a plan view of the upper frame member, with the preferred embodiment.

As illustrated in FIGS. 1–3: frame 12 comprises a side element 24 and a side element 26 of predetermined dimensions; each having an inclined section with a plurality of lock engagement holes 34 forming its proximal end, and a substantially horizontal section forming its distal end.

Frame 12 includes a transverse element 32 of predetermined dimensions, with one end attached to side element 24, and a second end attached to side element 26; these attachments being on the distal side of the angles forming the inclined sections of side elements 24, and 26.

Frame 12 also includes a diagonal brace 28 and a diagonal brace 30 of predetermined dimensions; each with one end attached at a predetermined point, on the proximal side of transverse element 32. Brace 28 has a second end attached to side element 24, at a predetermined point, on the proximal side of the angle forming the inclined section. Brace 30 has a second end attached to side element 26, at a predetermined point, on the proximal side of the angle forming the inclined section.

Brace 28 together with transverse element 32, and side element 24; as well as, brace 30 together with transverse element 32, and side element 26, form triangular relationships in both the horizontal and vertical planes; thereby restraining both lateral, and vertical displacement of the inclined sections.

Brace 28, brace 30, and transverse element 32 also form an abutment, for tree engagement, on the user's side of the tree.

Frame 12 also includes a tree-gripping girth assembly 13; for engaging the side of the tree, opposite the user. Assembly 13 includes a girth 14, an engagement sleeve 20, and an engagement sleeve 22. Girth 14 has one end attached to one side of sleeve 20 and a second end attached to one side of sleeve 22; in a substantially horizontal orientation. Sleeve 20 and sleeve 22 are slideably mated to the inclined sections of side element 24, and side element 26, respectively.

Sleeve 20 and sleeve 22 include a locking lug 16 and a locking lug 18, respectively; for securing assembly 13 at a desired mated position, along the inclined sections of side elements 24, and 26. Locking lug 16 and locking lug 18 include a bias spring 17 and a bias spring 19, respectively; to urge placement of locking lugs 16, and 18 into engagement holes 34.

Frame 12 also includes a sling attachment means 36, and a sling attachment means 38. Attachment means 36 is mounted to the approximate distal end of side element 24, and attachment means 38 is mounted to the approximate distal end of side element 26. Attachment means 36, and attachment means 38 accommodate a sling clip 68, and a sling clip 70, respectively.

Figure 6:
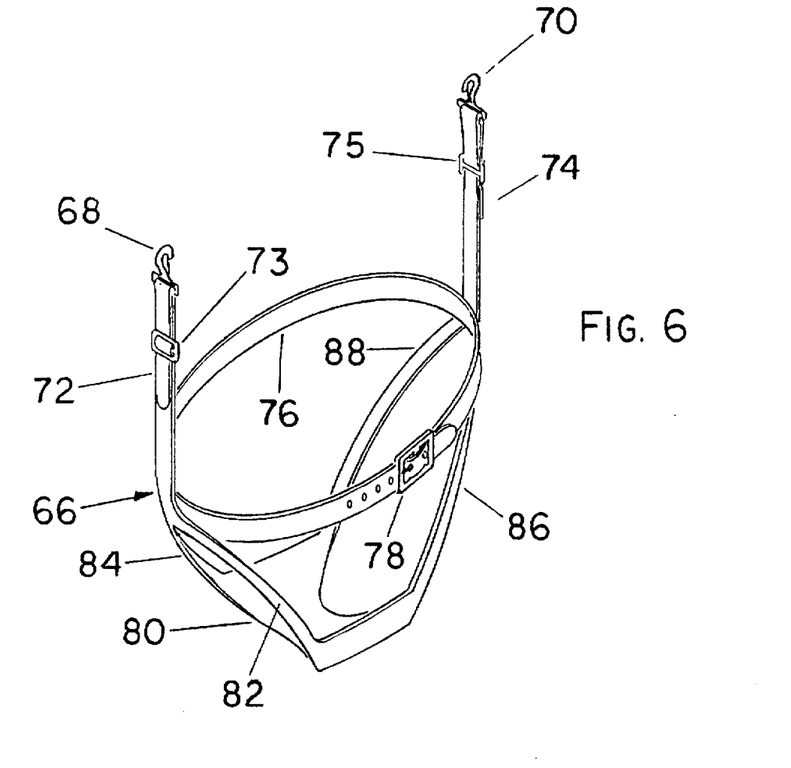
FIG. 6 is a perspective view of the sling seat and restraint belt of the preferred embodiment.

Seat assembly 66 as illustrated in FIG. 6, accommodates the body of the user. Assembly 66 includes a sling seat 80, comprised of a substantially hour-glass-shaped seat, having a seat strap 82, and a seat strap 84 extending from a respective corner on one side; also having a seat strap 86, and a seat strap 88 extending from a respective corner on a second side. A second end of strap 82, and strap 84 converge and attach to one end of a sling strap 72; a second end of strap 86, and strap 88 converge and attach to one end of a sling strap 74, a second end of sling strap 72, and sling strap 74 is adjustably connected to sling clip 68, and sling clip 70, respectively. Sling straps 72 and 74 include an adjustment buckle 73, and an adjustment buckle 75, respectively.

Assembly 66 also includes a seat restraint belt 76, which is adjustably attached to sling strap 72, and sling strap 74, respectively.

Restraint belt 76 includes an adjustment buckle 78, to snugly adjust restraint belt 76 around the user's torso.

Assembly 66 is removably connected to attachment eye 36, and attachment eye 38 when in the climb mode, as illustrated in FIG. 1.

Figure 4:
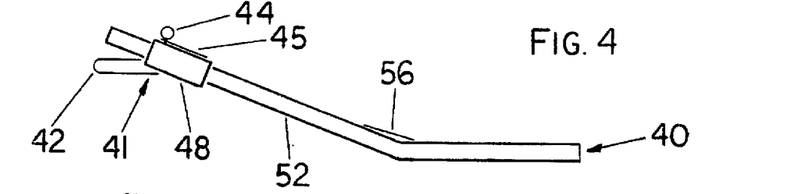
FIG. 4 is a side elevation view of the lower frame member, with the preferred embodiment.
Figure 5:
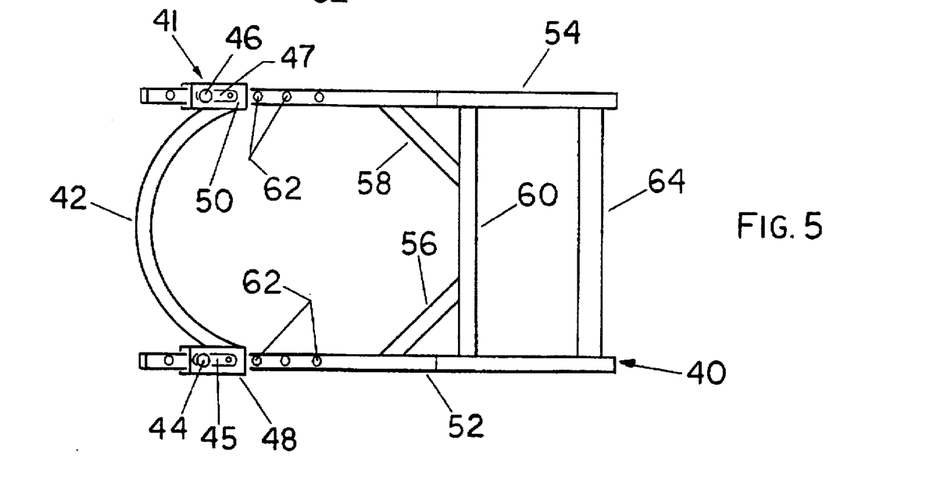
FIG. 5 is a plan view of the lower frame member, with the preferred embodiment.

As illustrated in FIGS. 4–5: frame 40 includes a side element 52 and a side element 54 of predetermined dimensions, each having an inclined section with a plurality of lock engagement holes 62 forming its proximal end, and a substantially horizontal section forming its distal end.

Frame 40 also includes a transverse element 60 of predetermined dimensions, with one end attached to side element 52, and a second end attached to side element 54; these attachments being on the distal side of the angles forming the inclined sections of side elements 52, and 54.

Frame 40 also includes a diagonal brace 56 and a diagonal brace 58 of predetermined dimensions; each with one end attached at a predetermined point, on the proximal side of transverse element 60. Brace 56 has a second end attached at a predetermined point, to side element 52, on the proximal side of the angle forming the inclined section. Brace 58 has a second end attached at a predetermined point, to side element 54, on the proximal side of the angle forming the inclined section.

Brace 56 together with transverse element 60, and side element 52; as well as, brace 58 together with transverse element 60, and side element 54, form triangular relationships in both the horizontal and vertical planes, thereby restraining both lateral and vertical displacement of the inclined sections.

Brace 56, diagonal brace 58, and transverse element 60 also form an abutment, for tree engagement, on the user's side of the tree.

Frame 40 also includes a gripping girth assembly 41; for engaging the side of the tree, opposite the user. Assembly 41 includes a girth 42, an engagement sleeve 48, and an engagement sleeve 50. Girth 42 has one end attached to one side of sleeve 48, and a second end attached to one side of sleeve 50. Sleeves 48, and 50 are slideably mated to the inclined sections of side element 52, and 54, respectively.

Sleeves 48, and 50 include a locking lug 44 and a locking lug 46, respectively; for securing assembly 41 at a desired mated position, along the inclined sections of elements 52, and 54. Locking lug 44, and locking lug 46 include a bias spring 45, and a bias spring 47, respectively; to urge placement of locking lugs 44, and 46 into engagement holes 62.

Frame 40 also includes a foot platform 64, as illustrated in FIG. 5; which accommodates the feet of the user. Platform 64 has one end attached to side element 52, and another end attached to side element 54, at the approximate distal ends of each.

Figure 7:
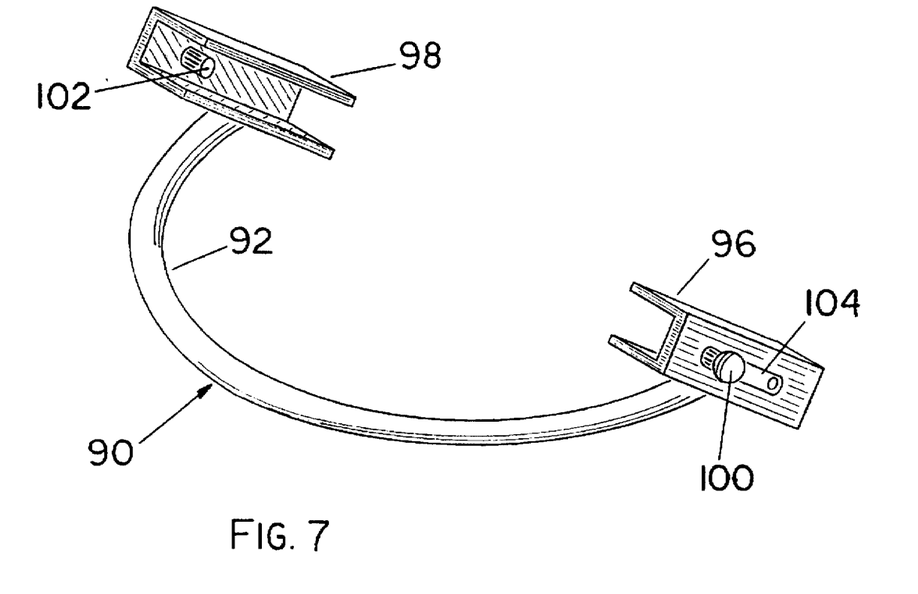
FIG. 7 is a perspective view of a second embodiment of the girth assembly.
Figures 8, 9:
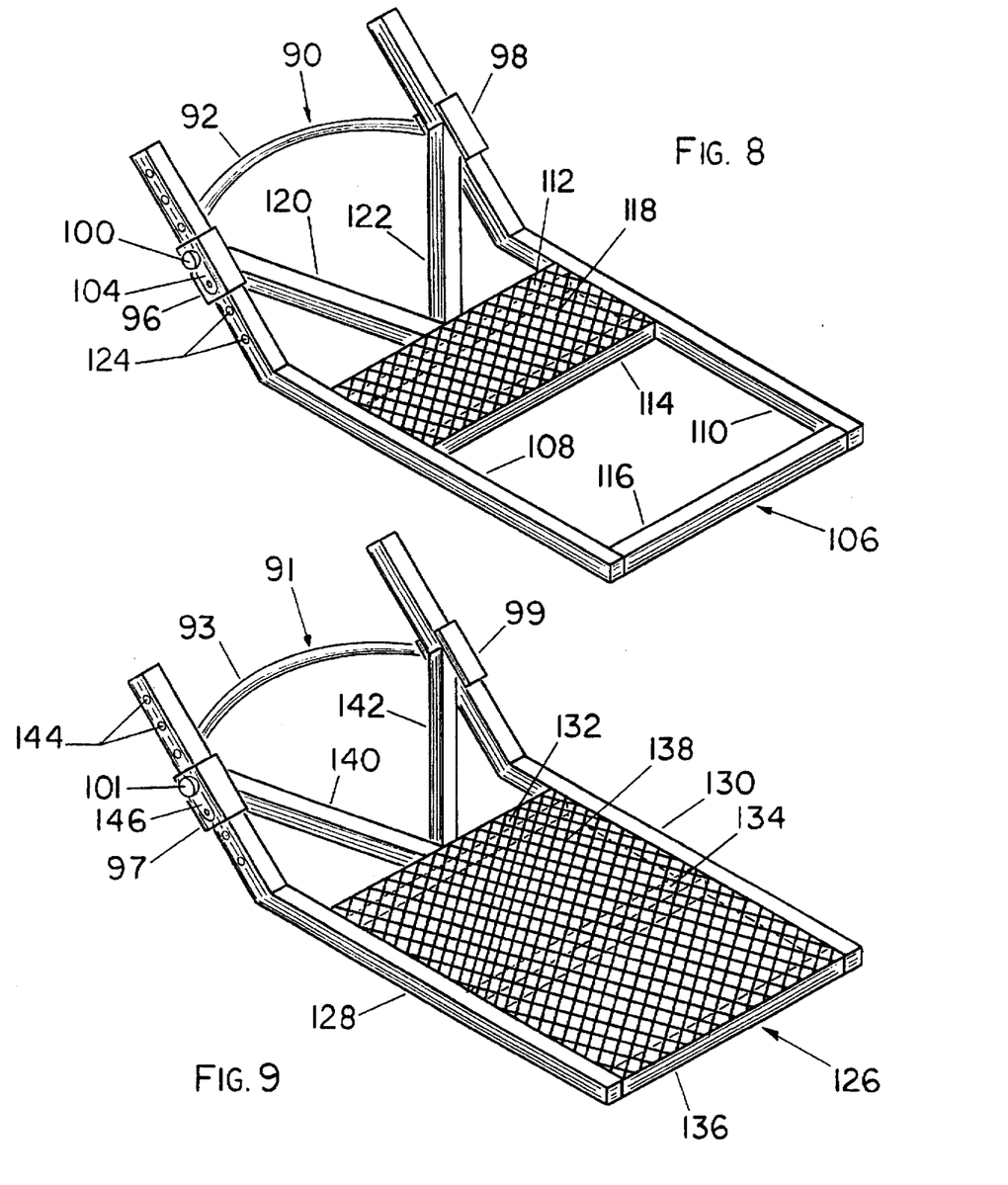
FIG. 8 is a perspective view of a second embodiment of the upper frame member.
FIG. 9 is a perspective view of a second embodiment of the lower frame member.

DESCRIPTION—FIGS. 7–9

Embodiments shown in FIGS. 7–9, are made of a rigid material, of sufficient strength to support the user, such as steel or aluminum tubing.

A climbing stand, comprised of an upper climbing frame member 106, and a lower climbing frame member 126, is illustrated in FIGS. 8–9.

Frame 106 comprises a side element 108, and a side element 110 of predetermined dimensions; each having an inclined section with a plurality of lock-engagement holes 124 forming its proximal end, and a substantially horizontal section forming its distal end.

Frame 106 includes a transverse element 112 of predetermined dimensions, with one end attached to side element 108, and a second end attached to side element 110; these attachments being on the distal side of the angles forming the inclined sections of side elements 108, and 110.

Frame 106 also includes a transverse element 114 of predetermined dimensions, with one end attached to side element 108 and a second end attached to side element 110; these attachments being spaced from, and parallel to transverse element 112.

Frame 106 also includes a transverse element 116 of predetermined dimensions, with one end attached to side element 108 and a second end attached to side element 110; these attachments being approximately at the distal ends.

Frame 106 also includes a diagonal brace 120, and a diagonal brace 122, of predetermined dimensions; each with one end attached at a predetermined point on the proximal side of transverse element 112. Brace 120 has a second end attached to side element 108 at a predetermined point, on the proximal side of the angle forming the inclined section. Brace 122 has a second end attached to side element 110 at a predetermined point, on the proximal side of the angle forming the inclined section. Brace 120 together with transverse element 112, and side element 108; as well as brace 122 together with transverse element 112, and side element 110, form triangular relationships in both the horizontal and vertical planes, thereby restraining both lateral and vertical displacement of the inclined sections.

Brace 120, and brace 122 also form an abutment, for tree engagement, on the user's side of the tree.

Frame 106 also includes a gripping girth assembly 90; for engaging the side of the tree, opposite the user. Assembly 90 includes a girth 92, an engagement guide 96, and an engagement guide 98, as illustrated in FIGS. 7–8. Girth 92 has one end attached to the underside of guide 96, and a second end attached to the underside of guide 98, in a substantially horizontal orientation. Guide 96, and guide 98 are slideably mated to the inclined sections of side element 108 and side element 110, respectively.

Guide 96, and guide 98 include a locking lug 100 and a locking lug 102, respectively; for securing assembly 90 at a desired mated position, along the inclined sections of side elements 108, and 110. Locking lug 100 and locking lug 102 include a bias spring 104 and a bias spring 105 (not shown), respectively; to urge placement of locking lugs 100, and 102 into engagement holes 124.

Frame 106 also includes a seat 118; which accommodates the body of the user. Seat 118 is attached to transverse elements 112 and 114, and side elements 108 and 110. Seat 118 is made of a material of sufficient strength to support the user, such as expanded metal, or nylon webbing.

Frame 106 also includes a restraint against lateral movement of the user; formed by transverse elements 114 and 116, and the distal ends of side elements 108 and 110.

As illustrated in FIG. 9: frame 126 comprises a side element 128 and a side element 130 of predetermined dimensions; each having an inclined section with a plurality of lock engagement holes 144 forming its proximal end, and a substantially horizontal section forming its distal end.

Frame 126 includes a transverse element 132 of predetermined dimensions, with one end attached to side element 128, and a second end attached to side element 130; these attachments being on the distal side of the angles forming the inclined sections of side elements 128, and 130.

Frame 126 also includes a transverse element 134 of predetermined dimensions, with one end attached to side element 128 a second another end attached to side element 130; these attachments being spaced from and parallel to transverse element 132.

Frame 126 also includes a transverse element 136 of predetermined dimensions, with one end attached to side element 128 and a second end attached to side element 130; these attachments being approximately at the distal ends.

Frame 126 also includes a diagonal brace 140 and a diagonal brace 142, of predetermined dimensions, each with one end attached at a predetermined point, on the proximal side of transverse element 132. Brace 140 has a second end attached to side element 128 at a predetermined point, on the proximal side of the angle forming the inclined section. Brace 142 has a second end attached to side element 130 at a predetermined point, on the proximal side of the angle forming the inclined section. Brace 140 together with transverse element 132, and side element 128; as well as brace 142 together with transverse element 132, and side element 130, form triangular relationships in both the horizontal and vertical planes, thereby restraining both lateral and vertical displacement of the inclined sections.

Brace 140, and brace 142 also form an abutment, for tree engagement, on the user's side of the tree.

Frame 126 also includes a tree-gripping girth assembly 91; for engaging the side of the tree, opposite the user. Assembly 91 includes a girth 93, an engagement guide 97, and an engagement guide 99, as illustrated in FIG. 9. Girth 93 has one end attached to the underside of guide 97, and a second end attached to the underside of guide 99. Guide 97, and guide 99 are slideably mated to the inclined sections of side element 128 and side element 130, respectively.

Guide 97 and guide 99 include a locking lug 101 and a locking lug 103 (not shown), respectively; for securing assembly 91 at a desired mated position, along the inclined sections of side elements 128, and 130. Locking lug 101 and locking lug 103 include a bias spring 146, and a bias spring 148 (not shown), respectively; to urge placement of locking lugs 101, and 103 into engagement holes 144.

Frame 126 also includes a foot platform 138, which accommodates the feet of the user. Platform 138 is attached to transverse elements 132, 134 and 136, and side elements 128 and 130. Platform 138, is made of a material of sufficient strength to support the user, such as expended metal, or nylon webbing.

FIG. 7, illustrates assembly 90, and similarly assembly 91 (not shown). This embodiment facilitates the elongation of braces 120, 122, 140, and 142; as seen in FIGS. 8-9.

OPERATION—FIGS. 1-6

The preferred method of operating the climbing stand illustrated in FIGS. 1-6 is: first the lower frame member 40 is mounted, at a convenient elevation on the tree or other structure. The tree or other structure is positioned between the inclined sections of side element 52 and side element 54, and against the abutment formed by diagonal brace 56, diagonal brace 58, and transverse element 60. Next the girth assembly 41 is mated to the inclined ends of side elements 52 and 54, and slideably adjusted to abut the back side of the tree or other structure, at a position that will support the horizontal sections with a slight incline to the distal ends.

The degree and purpose of this incline is to compensate for any taper in the structure to be climbed.

When the desired adjustment is attained, locking lug 44 and locking lug 46 are engaged with the nearest lock engagement holes 62; this maintains the relationship between the various abutted elements.

When frame 40 has been mounted; upper frame member 12, is positioned at a convenient height above the lower frame, with the tree or other structure positioned between the inclined sections of side element 24 and side element 26, and against the abutment formed by diagonal brace 28, diagonal brace 30, and transverse element 32. Next girth assembly 13 is mated to the inclined ends of side elements 24 and 26, and slideably adjusted to abut the back side of the tree or other structure, at a position that will support the horizontal sections with a slight incline to the distal ends.

The degree and purpose of this incline is to compensate for taper in the structure to be climbed.

When the desired adjustment is attained, locking lug 16 and locking lug 18 are engaged with the nearest lock engagement holes 34; this maintains the relationship between the various abutted elements.

When frame 12 has been mounted; sling seat assembly 66 is secured about the user's torso. The user's right leg is placed between seat straps 82 and 84; the user's left leg is placed between seat straps 86 and 88; then the assembly is raised to a position where sling seat 80 is comfortably engaged.

Next: seat restraint belt 76 is secured about the user's torso by snugly adjusting restraint adjustment buckle 78.

After assembly 66 is secured about the user's torso, the user mounts the lower frame. Grasping the upper frame member, and applying a constant downward force to the distal ends of side elements 24 and 26, the user steadies himself; while placing his feet on top of foot platform 64, with his toes under transverse element 60.

Standing on the lower platform; the user attaches sling clips 68 and 70, to sling attachment means 38 and 36 respectively. The user can then adjust the height of assembly 66, relative to frame 12, with adjustment buckles 73, and 75.

This completed, the user is ready to start climbing.

First: frame 12 is raised, by rotating the distal ends upward, to the extent of sling straps 72 and 74; and abutted against the structure anew, rotating the distal ends of side elements 24 and 26 downward, and applying weight. When frame 12 is secured to the structure, the user rests his full weight on the sling seat 80.

Next: the user raises frame 40, by rotating the distal end upward, with his legs and feet to a desired level; and abuts it against the structure anew, rotating the distal end of the frame member downward, and applying weight. When frame 40 is secured to the structure, the user then stands up, transferring his weight to frame 40.

This procedure is repeated until the desired elevation is reached. Upon reaching the desired elevation, the user is already seated and restrained.

To descend, the procedure is reversed.

OPERATION FIGS. 7-9

The operation of the climbing stand illustrated in FIGS. 7-9 is very similar to that of the preferred embodiment. The mounting of the lower frame member 126, and upper frame member 106 am identical to that of the preferred embodiment.

In this second embodiment, the user mounts the lower frame by: stepping through the hollow formed by side elements 108 and 110, and transverse elements 114 and 116, onto foot platform 138; and placing his toes under diagonal braces 140 and 142.

The upper frame member 106 is then raised to a convenient height, by rotating the distal end upward; and abutted against the structure anew, rotating the distal ends of side elements 108 and 110 downward, and applying weight.

When frame 106 is secured to the structure, the user then rests his full weight on transverse element 116, while steadying himself on side elements 108 and 110.

Next: the user raises the lower frame member 126, by rotating the distal end upward, with his legs and feet, to a desired level; and abuts it against the structure anew, rotating the distal end of the frame member downward, and applying weight.

When frame 126 is secured to the structure, the user then stands up, transferring his weight to the lower frame.

This procedure is repeated until the desired elevation is reached.

Once the desired elevation is reached, the user is free to stand on foot platform 138, or sit on either seat 118 or transverse element 116, all the while restrained from falling by the upper frame member 106.

To descend, the procedure is reversed.

SUMMARY, RAMIFICATIONS, AND SCOPE

Accordingly, the reader will see that the climbing stand of this invention makes multiple use of its various elements, not only reducing its overall weight, making transportation convenient; but, also making operation simple, with few parts to lose, or cause noise during use.

In addition to supporting the user throughout a climb on one or both frame members, safety is enhanced by a user restraint means which greatly reduces the risk of falling.

Furthermore, the girth assembly: minimizes torsion at the point of connection to the inclined side elements, enhancing structural soundness; and shortens the lever formed by the frame and girth, thereby increasing the mechanical advantage of the user's weight; thus giving the stand a greater grip of the structure.

Furthermore, stability is increased by abutting the structure on three or more sides; consequently reducing the load at each abutment, and thereby reducing damage to the structure.

Although the description above contains many specificities, these should not be construed as limiting the scope of the invention but as merely providing illustrations of some of the presently preferred embodiments of this invention. For example, the frame elements could be filled with a sound deadening substance, such as urethane foam; the frame elements, and girth assemblies could be made of a high density plastic, such as KEVLAR, a trademark of DuPont Corp.; the frame members and girth assemblies could be molded from these materials; the side elements, and the distal end transverse element could be replaced with a continuous U-shaped frame element; the girth assembly locking lugs could be replaced with a bolt-through design; the girth assembly locking lugs of FIGS. 8–9 could be relocated, similar to those of FIGS. 1–5; or vice versa; the locking lug bias springs could be replaced with coil springs; the sling attachment means could be eliminated and the attachment made directly to the side element; the center transverse element could be eliminated from the foot platform; the foot platform of the preferred embodiment could be augmented with an expanded metal; the foot platform could include straps to accommodate the feet; the second embodiment seat, in FIG. 8, could be moved to the distal end of the frame; or made moveable; the sling seat assembly could include a back support; the gripping girth could be made resilient; a tensioning strap could be included, to bias the abutting elements; bundling straps could be added, for transport; a backpack designed to cradle the bundled climbing stand for transport, could be added; etc.

Thus the scope of the invention should be determined by the appended claims and their legal equivalents, rather than by the examples given.

I claim:

1. A device for climbing and supporting a user on a vertical structure of limited diameter comprising a first climbing frame member, and a second climbing frame member, each having a means for gripping said vertical structure;

said first climbing frame member includes a first and a second, parallel and spaced, elongated side elements, of predetermined length, each having an angle of predetermined degree forming an inclined proximal end and a substantially horizontal distal end;

said first climbing frame member further includes a first elongated transverse element, of predetermined length, having a first end attached to said first side element and a second end attached to said second side element, at predetermined points on the distal side of said angles;

said first climbing frame member further includes a first diagonal brace, with a first end attached to said first side element at a predetermined point on the proximal side of said angle, and a second end attached at a predetermined point on said first transverse element;

said first climbing frame member further includes a second diagonal brace, with a first end attached to said second side element at a predetermined point on the proximal side of said angle, and a second end attached at a predetermined point on said first transverse element;

whereby, said first and second side elements, said first transverse element, and said first and second diagonal braces form triangular relationships in both the vertical and horizontal planes, thereby restraining the inclined sections of said side elements from both vertical and lateral displacement;

said first climbing frame member further includes a first girth, for engaging said vertical structure;

said first girth comprises a second elongated transverse element of predetermined length, having a first end attached to a first engagement means and a second end attached to a second engagement means, for engaging said first and second side elements, respectively; said first and second engagement means slidably mate to the inclined proximal ends of said first and second side element; said second transverse element is arcuated and fixedly attached to said first and second engagement means, in a horizontal plane which is angled with respect to a plane of said inclined proximal ends of said first and second side elements; said first climbing frame member further includes a seat having a seat restraint belt and suspended from said first and second side elements by sling straps.

said second climbing frame member includes a third and a fourth, parallel and spaced, elongated side elements, of predetermined length, each having an angle of predetermined degree forming an inclined proximal end and a substantially horizontal distal end;

said second climbing frame member further includes a third elongated transverse element, of predetermined length, having a first end attached to said third side element and a second end attached to said fourth side element, at predetermined points on the distal side of said angles;

said second climbing frame member further includes a third diagonal brace, with a first end attached to said third side element at a predetermined point on the proximal side of said angle, and a second end attached at a predetermined point on said third transverse element;

said second climbing frame member further includes a fourth diagonal brace, with a first end attached to said fourth side element at a predetermined point on the proximal side of said angle, and a second end attached at a predetermined point on said third transverse element;

whereby, said third and fourth side elements, said third transverse element, and said third and fourth diagonal braces form triangular relationships in both the vertical and horizontal planes, thereby restraining the inclined sections of said side elements from both vertical and lateral displacement;

said second climbing frame member further includes a second girth, for engaging said vertical structure;

said second girth comprises a fourth elongated transverse element, of predetermined length, having a first end attached to a third engagement means and a second end attached to a fourth engagement means, for engaging said third and fourth side elements, respectively; said third and fourth engagement means slidably mate to the inclined proximal ends of said third and fourth side element; said fourth transverse element is arcuated and fixedly attached to said third and fourth engagement means, in a horizontal plane which is angled with respect to a plane of said inclined proximal ends of said third and fourth side elements.

2. Apparatus according to claim 1, wherein:

said first and second diagonal braces and said first transverse element form a first abutment means for gripping said structure on the user's side; and said third and fourth diagonal braces and said third transverse element form a second abutment means for gripping said structure on the user's side.

3. Apparatus according to claim 1, wherein:

said second climbing frame member further includes a fifth elongated transverse element of predetermined length, spaced and parallel to said third transverse element, having a first end attached to said third side element and a second end attached to said fourth side element, approximately at the distal ends of said side elements.

4. Apparatus according to claim 3, wherein:

said second climbing frame member further includes a platform means, to accommodate the feet of the user.

5. Apparatus according to claim 1, wherein:

said first and second engagement means include a first and a second locking means, respectively; and said third and fourth engagement means include a third and a fourth locking means, respectively;

whereby, said first and second girths may be secured at a desired mated position.

6. A device for climbing and supporting a user on a vertical structure of limited diameter comprising a first climbing frame member, and a second climbing frame member, each having a means for gripping said vertical structure;

said first climbing frame member includes a first and a second, parallel and spaced, elongated side elements, of predetermined length, each having an angle of predetermined degree forming an inclined proximal end and a substantially horizontal distal end;

said first climbing frame member further includes a first elongated transverse element, of predetermined length, having a first end attached to said first side element and a second end attached to said second side element, at predetermined points on the distal side of said angles;

said first climbing frame member further includes a first diagonal brace, with a first end attached to said first side element at a predetermined point on the proximal side of said angle, and a second end attached at a predetermined point on said first transverse element;

said first climbing frame member further includes a second diagonal brace, with a first end attached to said second side element at a predetermined point on the proximal side of said angle, and a second end attached at a predetermined point on said first transverse element;

whereby, said first and second side elements, said first transverse element, and said first and second diagonal braces form triangular relationships in both the vertical and horizontal planes, thereby restraining the inclined sections of said side elements from both vertical and lateral displacement;

said first and second diagonal braces and said first transverse element form a first abutment means for gripping said structure on the user's side;

said first climbing frame member further includes a first girth, for gripping a side of said vertical structure opposite the user;

said first girth comprising a second elongated transverse element, of predetermined length, in a horizontal plane which is angled with respect to a plane of said inclined proximal ends of said first and second elements; having a first end fixedly attached to a first engagement means, which includes a first locking means for adjustably engaging the proximal end of said first side element, and a second end fixedly attached to a second engagement means, which includes a second locking means for adjustably engaging the proximal end of said second side element; said first climbing frame member further includes a seat having a seat restraint belt and suspended from said first and second side elements by sling straps;

said second climbing frame member includes a third and a fourth, parallel and spaced, elongated side elements, of predetermined length, each having an angle of predetermined degree forming an inclined proximal end and a substantially horizontal distal end;

said second climbing frame member further includes a third elongated transverse element, of predetermined length, having a first end attached to said third side element and a second end attached to said fourth side element, at predetermined points on the distal side of said angles;

said second climbing frame member further includes a third diagonal brace, with a first end attached to said third side element at a predetermined point on the proximal side of said angle, and a second end attached at a predetermined point on said third transverse element;

said second climbing frame member further includes a fourth diagonal brace, with a first end attached to said fourth side element at a predetermined point on the proximal side of said angle, and a second end attached at a predetermined point on said third transverse element;

whereby, said third and fourth side elements, said third transverse element, and said third and fourth diagonal braces form triangular relationships in both the vertical and horizontal planes, thereby restraining the inclined sections of said side elements from both vertical and lateral displacement;

said third and fourth diagonal braces and said third transverse element form a second abutment means for gripping said structure on the user's side;

said second climbing frame member further including a second girth, for gripping the side of said vertical structure opposite the user;

said second girth comprising a fourth elongated transverse element, of predetermined length, in a horizontal plane which is angled with respect to a plane of said inclined proximal ends of said third and fourth side elements, having a first end fixedly attached to a third engagement means, which includes a third locking means for adjustably engaging the proximal end of said third side element, and a second end fixedly attached to a fourth engagement means, which includes a fourth locking means for adjustably engaging the proximal end of said fourth side element.

* * * * *